United States Patent [19]

Utsumi et al.

[11] Patent Number: 4,814,426
[45] Date of Patent: Mar. 21, 1989

[54] SHRINKABLE POLYESTER FILM FOR PACKAGING

[75] Inventors: Shigeo Utsumi, Yokohama; Yujiro Fukuda, Machida, both of Japan

[73] Assignee: Diafoil Company, Limited, Tokyo, Japan

[21] Appl. No.: 73,578

[22] Filed: Jul. 15, 1987

[30] Foreign Application Priority Data

Jul. 18, 1986 [JP] Japan ................................ 61-169491

[51] Int. Cl.$^4$ .............................................. C08G 63/02
[52] U.S. Cl. ..................................... 528/272; 528/302; 528/305; 528/308.1; 528/308.6; 264/176.1
[58] Field of Search ...................... 528/302, 385, 308.1, 528/308.6, 272; 264/176.1

[56] References Cited

U.S. PATENT DOCUMENTS 4,096,126  6/1978  Tanaka et al. ...................... 528/305
4,362,775 12/1982  Yabe et al. .......................... 525/170

FOREIGN PATENT DOCUMENTS 57-42726   3/1982  Japan .
57-159618 10/1982  Japan .
59-97175   6/1984  Japan .
60-206839 10/1985  Japan .
60-253545 12/1985  Japan .
60-64430   4/1986  Japan .

Primary Examiner—Morton Foelak
Assistant Examiner—S. A. Acquah
Attorney, Agent, or Firm—Oblon, Fisher, Spivak, McClelland & Maier

[57] ABSTRACT

A shrinkable film for packaging excellent in the heat-sealing property and the shrinking property is disclosed. This shrinkable film is obtained by stretching a film of a mixture comprising 100 to 30 weight parts of a crystalline polyester (A), which comprises mainly terephthalic acid and 1,4-cyclohexane dimethanol and has a heat of crystalline melting of not less than 3 cal/g and a melting point in the range of 200° to 310° C., and 0 to 70 weight parts of a polyester (B) comprising terephthalic acid and/or 2,6-naphthalene dicarboxylic acid as the dicarboxylic acid constitutional unit and ethylene glycol and/or 1,4-butylene glycol as the glycol constitutional unit. The mixture of the polyester (A) and polyester (B) has a good handling property in drying. The shrinkable film for packaging of the present invention can be produced without any difficulty in drying and shows the ratio of shrinkage of 40 to 90% after 5-minute heat treatment at 100° C. in either of the longitudinal and transverse directions, the ratio of shrinkage or expansion of not more than 15% after 5-minute heat treatment at 100° C. in the other direction and the haze of not more than 10% at a film thickness of 35 μm.

15 Claims, No Drawings

SHRINKABLE POLYESTER FILM FOR PACKAGING

BACKGROUND OF THE INVENTION

The present invention relates to a polyester shrinkable film for packaging which, in process of production, shows a good handling property in drying and, as a finished product, is excellent in both the heat-sealing property and the shrinking property.

At present, shrinkable film of polyvinyl chloride and paper are widely used as materials for the labels on containers. As containers for refreshing beverages, however, bottles made of polyethylene terephthalate (PET) have been finding growing acceptance in addition to glass bottles. To encourage recovery of used PET bottles for re-use, the desirability of using labels made of polyester shrinkable film on the PET bottles has been finding wide recognition.

In answer to this desire, it has been proposed to obtain a film suitable for the aforementioned labels by extruding an amorphous copolyester or a composition of the amorphous copolyester and PET or polybutylene terephthalate (PBT) into the form of a sheet and monoaxially stretching the extruded sheet in the longitudinal direction or the transverse direction (as disclosed in the specifications of Japanese Patent Application Laying-Open (KOKAI) No. 57-42,726 (1982), Japanese Patent Application Laying-Open (KOKAI) No. 57-159,618 (1982), and Japanese Patent Application Laying-Open (KOKAI) No. 59-97,175 (1984).

The copolyester hitherto proposed for the production of the film under discussion, however, is amorphous and has a second-order transition temperature of about 80° C. When such polyester is dried at a temperature exceeding 80° C., the polyester is fused to be a form of a conglomerate and must be dried overnight under a vacuum at a low temperature of about 60° C. When the production of the film is to be carried out on a commercial scale, the drying effected in the manner just described is not practicable because the drying consumes an unduly long time and, as the inevitably result, the continuous conversion of the polyester into the film necessitates the use of an unusually large continuous or batchwise vacuum drying device.

As the results of research for solving the problem in drying, the present inventors have consequently found that a composition of a specific crystalline polyester and PET, PBT, etc. can be dried under ordinary conditions without any difficulty and any particular device therefor and, in addition to the above, a film produced from such a composition is excellent in both the heat-sealing property and the shrinking property. On the basis of this findings, the present inventors have accomplished the present invention.

SUMMARY OF THE INVENTION

In a first aspect of the present invention there is provided a shrinkable polyester film for packaging which comprises 100 to 30 parts by weight of a crystalline polyester (A), in which 70 to 100 mol% of the dicarboxylic acid constitutional unit is telephthalic acid and 50 to 100 mol% of the glycol constitutional unit is 1,4-cyclohexane dimethanol, having a heat of crystalline melting of not less than 3 cal/g and a melting point in the range of 200° to 310° C. and 0 to 70 parts by weight of a polyester (B) comprising terephthalic acid and/or 2,6-naphthalene dicarboxylic acid as the dicarboxylic acid constitutional unit and ethylene glycol and/or 1,4-butadiene glycol as the glycol constitutional unit, said shrinkable polyester film having the ratio of shrinkage in the range of 40 to 90% in either of the longitudinal and transverse directions after 5-minute heat treatment at 100° C., the ratio of shrinkage or expansion of not more than 15% in the other direction after 5-minute heat treatment at 100° C. and a haze of not more than 10% at a thickness of 35 $\mu$m.

In a second aspect of the present invention, there is provided a method for the production of a shrinkable polyester film for packaging having the ratio of shrinkage in the range of 40 to 90% in either of the longitudinal and transverse directions after 5-minute heat treatment at 100° C., the ratio of shrinkage or expansion of not more than 15% in the other direction after 5-minute heat treatment at 100° C. and a haze of not more than 10% at a thickness of 35 $\mu$m, which method comprises mixing 30 to 100 parts by weight of a crystalline polyester (A), in which 70 to 100 mol% of the dicarboxylic acid constitutional unit is terephthalic acid and 50 to 100 mol% of the glycol constitutional unit is 1,4-cyclohexane dimethanol, having a heat of crystal line melting of not less than 3 cal/g and a melting point in the range of 200° C. to 310° C. with 0 to 70 parts by weight of a polyester (B) comprising terephthalic acid and/or 2,6-naphthaline dicarboxylic acid as the dicarboxylic acid constitutional unit and ethylene glycol and/or 1,4-butylene glycol and the glycol constitutional unit, drying the resultant mixture at a temperature in the range of 100° to 250° C. for 1 to 20 hours, extruding the dried mixture at a temperature in the range of 200° to 350° C. thereby obtaining an unstretched film and monoaxially stretching said unstretched by 1.6 to 6.0 times at a temperature in the range of 60° to 150° C. either longitudinally or transversely; simultaneously or sequentially stretching said film at a temperature in the range of 60° to 150° C. either transversely or longitudinally by 1.6 to 6.0 times and at a temperature in the range of 60° to 150° C. in the other direction to 1.01 to 2.0 times; or simultaneously or sequentially biaxially stretching said film at a temperature in the range of 60° to 150° C. by 1.01 to 6.0 times and subsequently re-stretching said film transversely or longitudinally at a temperature in the range of 60° to 150° C. by 1.01 to 3.0 times.

DETAILED DESCRIPTION OF THE INVENTION

The present invention relates to a shrinkable polyester film for packaging obtained by extruding and stretching a composition comprising a crystalline polyester (A) and a polyester (B) to the form of a film so that the film has the ratio of shrinkage in the range of 40 to 90% in either of the longitudinal and transverse directions after 5-minute heat treatment at 100° C. and the ratio of shrinkage or expansion of not more than 15% in the other direction after 5-minute heat treatment at 100° C. and a haze of not more than 10% at a thickness of 35 $\mu$m.

The crystalline polyester (A) used in the present invention is a polyester wherein 70 to 100 mol%, preferably 80 to 100 mol%, of the dicarboxylic acid constitutional unit thereof is terephthalic acid and 50 to 100 mol%, preferably 65 to 100 mol%, of the glycol constitutional unit thereof is 1,4-cyclohexane dimethanol. As examples of compounds for the dicarboxylic acid constitutional unit other than terephthalic acid, there can be cited oxalic acid, malonic acid, succinic acid, adipic acid, azelaic acid, sebacic acid, phthalic acid, isophthalic acid, naphthalene dicarboxylic acid, and diphenyl ether dicarboxylic acid. If the amount of terephthalic acid in the dicarboxylic acid constitutional unit is less than 70 mol%, the polyester (A) has an insufficient crystallinity and not suitable for the object of this invention. As examples of compounds for the glycol constitutional unit other than 1,4-cyclohexane dimethanol, there can be cited ethylene glycol, propylene glycol, trimethylene glycol, tetramethylene glycol, hexamethylene glycol, diethylene glycol, and polyalkylene glycols. If the amount of 1,4-cyclohexane dimethanol in the glycol constitutional unit is less than 50 mol%, there invites the disadvantage that the polyester (A) assumes an amorphous state and, consequently, the good handling property in drying of the polyester composition in process of production is impaired or the film as a finished product fails to have the ratio of shrinkage not less than the lower limit of 40% in either of the longitudinal and transverse directions (after 5-minute heat treatment at 100° C.).

In the present invention, in addition to the various dicarboxylic acids and glycols enumerated above, other compounds, for example, one or more compounds selected from the group consisting of oxycarboxylic acids such as p-oxybenzoic acid and p-oxyethoxybenzoic acid, monofunctional compounds such as benzoic acid, benzoylbenzoic acid, and methoxypolyalkylene glycols, and multifunctional compounds such as glycerin, and pentaerythritol can be also used in an amount such that the produced polyester (A) will be substantially linear polymer. The polyester (A) obtained by the conventional procedure using the aforementioned monomers in an amount specified above is a crystalline polyester which has a heat of crystalline melting not less than 3 cal/g, preferably 3 to 11 cal/g, and a melting point in the range of 200° C. to 310° C., preferably 220° to 290° C. If the heat of crystalline melting is less than 3 cal/g or the melting point is less than 200° C., the produced polyester cannot be dried under normal conditions. If the melting point exceeds 310° C., there ensues the disadvantage that the polyester cannot be extruded simultaneously with PET, PBT, etc. during the step to be described later.

The polyester (B) used in the present invention is at least one of homopolyesters and copolyesters comprising terephthalic acid and/or 2,6-naphthalene dicarboxylic acid as the dicarboxylic acid constitutional unit thereof and ethylene glycol and/or 1,4-butylene glycol as the glycol constitutional unit thereof. The polyester (B) can include a copolyester such that not more than 20 mol% of the constitutional repeating units thereof comprise one or more of the compounds other than the aforementioned dicarboxylic acids and diols, which have heretofore been used as components for polyesters. Otherwise, the polyester (B) may be a mixed polyester obtained by adding a polymer such as polyamide, polyolefin, polycarbonate, etc. into the aforementioned homopolyester(s) and/or copolyester(s) in an amount not so large as to impair the object of the present invention.

The mixing ratio of the polyester (A) to the polyester (B), i.e. (A)/(B), is in the range of 100/0 to 30/70, preferably 90/10 to 40/60, by weight. If the weight of the polyester (A) is less than 30% of the total weight of the polyester (A) and the polyester (B), there ensues the disadvantage that the produced unstretched film is opacified in white and the stretched film fails to have a haze not more than the upper limit of 10%.

The polyester (A) and the polyester (B) may be dried separately and then mixed with each other. Preferably, the polyester (A) and the polyester (B) are mixed first and the resultant mixture is dried with a paddle drier under the conditions (1 to 20 hours at 100° to 250° C.) which are generally adopted for drying polyethylene terephthalate and then extruded at a temperature in the range of 200° C. to 350° C. to produce unstretched film. The mixture of the polyester (A) and polyester (B) may be pelletized or made into chips before subjecting the mixture to extrusion, if necessary. The extruded polyester is preferably cooled and solidified on a cooling drum by the electrostatic contact method. Subsequently, the unstretched film is monoaxially stretched longitudinally or transversely so that the monoaxially stretched film satisfy the shrinking property described later. This monoaxial stretching can be effected only in the longitudinal direction with rolls or only in the transverse direction with a tenter. It is also preferable to carry out the stretching by stretching the film in either of the longitudinal and transverse directions more strongly than in the other direction using the conventional biaxial stretching method, or by restretching the film in either of the longitudinal and transverse directions after the biaxial stretching so far as the stretched film has the shrinking property set forth below.

The monoaxial stretching is preferably carried out at a temperature in the range of 60° to 150° C. in the transverse or longitudinal direction by 1.6 to 6.0 times. The biaxial stretching is preferably carried out at a temperature in the range of 60° to 150° C. in either of the transverse and longitudinal directions by 1.6 to 6.0 times and at a temperature in the range of 60° to 150° C. in the other direction by 1.01 to 2.0 times, either simultaneously or sequentially. The restretching is preferably carried out transversely or longitudinally at a temperature in the range of 60° to 150° C. by 1.01 to 3.0 times after the film has been simultaneously or sequentially stretched biaxially at a temperature in the range of 60° to 150° C. by 1.01 to 6.0 times.

The film which has been oriented more strongly in either of the longitudinal and transverse directions than in the other direction is taken up on a roll. In this case, the film, when necessary, may be heat set at a temperature not higher than 100° C.

The film consequently obtained has the ratio of shrinkage of 40 to 90%, preferably 50 to 90% in either of the longitudinal and transverse directions after 5-minute heat treatment at 100° C., and the ratio of shrinkage or expansion of not more than 15%, preferably 0.1 to 10% in the other direction after 5-minute heat treatment at 100° C. If the ratio of shrinkage is less than 40% in both the longitudinal and the transverse direction, the film exhibits poor adhesiveness to a bottle made from PET, PBT, etc. If this ratio of shrinkage exceeds 90%, there ensues the disadvantage that the shrinkage stress is so high as to induce the problem of peeling of a label from a bottle. Conversely, if the ratio of shrinkage or expansion in the other direction exceeds 15%, there ensues the disadvantage that the film, when used as a label, suffers from deformation of a printed pattern after shrinkage.

The shrinkable polyester film for packaging of the present invention is required to be transparent. For the purpose of ensuring a good winding property of the shrinkable film and good workability of the shrinkable film during actual use, however, the shrinkable film is allowed to contain therein fine particles in an amount not so large as to impair the required transparency. The film of the present invention has a haze of not more than 10%, preferably in the range of 0.1 to 10%, and more preferably 0.1 to 5%, at a thickness of 35 μm. The fine particles used for imparting a flipping property to the film may be external inert particles (added after the formation of polyester) such as kaolin, clay, calcium carbonate, silicon oxide, calcium terephthalate, aluminum oxide, titanium dioxide, calcium phosphate, and lithium fluoride; high melting organic compounds and cross-linked polymers, both of which do not melt during the melting step of film production; and internal inert particles formed inside the polyester (A) and/or the polyester (B) during the production thereof by metal compound catalyst such as alkali metal compounds and alkaline earth metal compounds.

These fine particles may be added to the polyester (A) and/or the polyester (B) at any step between and including the polymerization thereof and the extrusion of the mixture of the polyester (A) and the polyester (B).

The content of these fine particles in the film is preferably in the range of 0.005 to 0.9% by weight and the average diameter of the fine particles in the range of 0.01 to 3.5 μm.

In accordance with the present invention, the film excellent in both the heat-sealing property and the shrinking property can be obtained by using the existing apparatus for the production of polyethylene terephthalate without making any alteration. Thus, the present invention has an extremely high economic value.

The shrinkable polyester film of the present invention is suitable for packaging materials such as labels for a bottle made of PET, PBT, etc. The labels for a plastic bobble, for example, is produced by printing necessary information on the shrinkable polyester film of the present invention according to the conventional method and is put on a plastic bottle by heat treatment according to the usual method well known in the packaging industry.

Now, the present invention will be described more precisely referring the following non-limitative examples.

The films produced in the following examples were evaluated by tests conducted by the following methods.

(1) Film haze

This property was determined by the method of JIS (Japanese Industrial Standard) K-6714, using an intergratingsphere turbidometer (produced by Nippon Denshoku Kogyo K.K. and marketed under product code of NDH-20D).

(2) Ratio of shrinkage

This property was determined by subjecting a given film to heat treatment under no load in a geared oven kept at a controlled temperature of 100° C.±2° C. for a period of 5 minutes and calculating by means of the following formula.

$$\text{Ratio of shrinkage} = \frac{L_0 - L}{L_0}$$

(wherein $L_0$ stands for the original length of the given film and L for the length of the film after shrinkage).

(3) Heat of crystalline melting

This property was determined by using a device produced by Perkin Elmer Corp. and marketed under product code of DSC-1B. A given film was heated under the conditions of sensitivity of 4, temperature increasing speed of 16° C./min., and chart speed of 40 mm/min. and the heat of crystalline melting was calculated from the observed results by means of the following formula.

$$\text{Heat of crystalline melting} = A \cdot S_1 \cdot \frac{1}{m}$$

(wherein A stands for the amount of heat corresponding to unit area (cal/cm$^2$) under the temperature-time curve for indium as a standard under the same test conditions, $S_1$ for the total area under the curve for the given film, and m for the weight (g) of the film).

(4) Peel force

After subjecting a test film (15 mm whidth) to heat sealing peel force was measured according to T-peel method by using Intesco 2001-type produced by Intesco Corp.

Generally, the peel force of not lower than 500 gf/mm$^2$ is fully sufficient for the practical use.

EXAMPLES 1–8 AND COMPARATIVE EXPERIMENTS 1–2

As Polyester (A), a copolyester comprising the dicarboxylic acid constitutional unit comprising 87 mol% of terephthalic acid and 13 mol% of isophthalic acid and 1,4-cyclohexane dimethanol as the glycol constitutional unit was used. The melting point of this polyester (A) was 265° C., the heat of crystalline melting thereof was 8.5 cal/g, and the intrinsic viscosity thereof was 0.78.

As Polyester (B), polyethylene terephthalate containing a prescribed amount of amorphous silica (Syloid ®) particles of 1.8 μm in diameter was used. The polyester (A) and the polyester (B) were blended in a varying weight ratio shown in Table 1, then dried in a hopper drier at 180° C. for three hours, and subsequently extruded and cooled by the conventional method to prepare an unstretched sheet. The unstretched sheet was stretched at a varying ratio at 80° C. and then taken up. The resulta were as shown in Table 1.

EXAMPLES 9–10 AND COMPARATIVE EXPERIMENT 3

An unstretched sheet obtained by following the procedure of Example 2 was directly introduced by a tenter, laterally stretched at 80° C. at a varying ratio, then cooled to room temperature, and taken up. The results were as shown in Table 1.

COMPARATIVE EXPERIMENT 4

As Polyester (A), a copolyester comprising terephthalic acd as a dicarboxylic acid constitutional unit and a glycol constitutional unit comprising 30 mol% of ethylene glycol and 70 mol% of 1,4-cyclohexane dimethanol was used. As Polyester (B), polyethylene terephthalate was used. The Polyester (A) and the polyester (B) were blended in a ratio of 30/70 by weight and dried in a hopper drier at 180° C. for three hours. The chips were thoroughly fused in the form of a conglomerate. As the result, the conglomerate could not be subjected to extrusion and processing for the production of a film.

In this case, the polyester (A) showed no definite melting point. The heat of crystalline melting of the polyester (A) was virtually 0 cal/g.

EXAMPLE 11

A polyester (A), a copolyester comprising terephthalic acid as a dicarboxylic acid constitutional unit and a glycol constitutional unit comprising 15 mol% of ethylene glycol and 85 mol% of 1,4-cyclohexane dimethanol was used. The melting point of this copolyester was 255° C. and the heat of crystalline melting thereof was 8.2 cal/g. As Polyester (B), polyethylene terephthalate was used. The Polyester (A) and the Polyester (B) were blended in a weight ratio of 1:1 and, by following the procedure of Example 1, dried and extruded to obtain an unstretched film. This film was longitudinally stretched at 83° C. by 3.7 times and taken up to be used as a sample. The amorphous silica (Syloid ®) particles were incorporated therein so that the content thereof in the film is 200 ppm. The results are shown in Table 1.

of the longitudinal or transverse directions after a 5-minute heat treatment at 100° C., the ratio of shrinkage or expansion being not more than 15% in the other direction after said 5-minute heat treatment at 100° C., and having a haze of not more than 10% at a thickness of 35 μm, which shrinkable polyester film is produced by:
(i) mixing 40-90 parts by weight of a crystalline polyester (A), in which 70-100 mol% of the dicarboxylic acid constitutional unit is terephthalic acid and 50-100 mol% of the glycol constitutional unit is 1,4-cyclohexane dimethanol, having a heat of crystalline melting of not less than 3 cal/g and a melting point in the range of 200° C.-310° C., with 10-60 parts by weight of a polyester (B) comprising terephthalic acid or 2,6-naphthalene dicarboxylic acid or a mixture thereof as the dicarboxylic acid constitutional unit and ethylene glycol or 1,4-butylene glycol or a mixture thereof as the glycol constitutional unit;
(ii) drying the resulting mixture at a temperature in the range of 100°-250° C. for 1 to 20 hours, and extruding the dried mixture at a temperature in the range of 200°-350° C., thereby obtaining an unstretched film; and

TABLE 1

| | Polyester (A) Polyester (B) (wt/wt) | Manner of stretching | Ratio of stretching | Content of amorphous silica particles in film | Ratio of shrinkage (%) Long. | Trans. | Haze | Planarity | Peel force (gf/mm²) |
|---|---|---|---|---|---|---|---|---|---|
| Example 1 | 50/50 | Mono. Long. | × 3.7 | 200 ppm | 72 | 3 | 2.5 | good | 850 |
| Example 2 | 70/30 | Mono. Long. | × 3.7 | 200 ppm | 71 | 0 | 2.7 | good | 1050 |
| Example 3 | 100/0 | Mono. Long. | × 3.7 | 200 ppm | 63 | 4 | 2.8 | good | 900 |
| Example 4 | 70/30 | Mono. Long. | × 3.0 | 200 ppm | 65 | 1 | 2.1 | ordinary | 1100 |
| Example 5 | 70/30 | Mono. Long. | × 4.0 | 200 ppm | 70 | −2 | 3.0 | good | 1020 |
| Example 6 | 70/30 | Mono. Long. | × 3.5 | 100 ppm | 68 | 1 | 1.2 | good | 1050 |
| Example 7 | 70/30 | Mono. Long. | × 3.5 | 200 ppm | 68 | 1 | 2.5 | good | 1050 |
| Example 8 | 70/30 | Mono. Long. | × 3.5 | 300 ppm | 68 | 1 | 3.7 | good | 1050 |
| Example 9 | 50/50 | Mono. Trans. | × 3.5 | 200 ppm | 3 | 65 | 2.5 | good | 1050 |
| Example 10 | 50/50 | Mono. Trans. | × 4.0 | 200 ppm | 1 | 70 | 3.0 | good | 1020 |
| Example 11 | 50/50 | Mono. Long. | × 3.7 | 200 ppm | 68 | 0 | 2.7 | good | 970 |
| Comparative Experiment 1 | 20/80 | Mono. Long. | × 3.7 | 200 ppm | — | — | * | good | 230 |
| Comparative Experiment 2 | 70/30 | Mono. Long. | × 1.5 | 600 ppm | 33 | 2 | 2.8 | good | 1140 |
| Comparative Experiment 3 | 50/50 | Mono. Trans. | × 2.0 | 400 ppm | Not stretched uniformly. | | | | 1130 |

Mono. = Monoaxial
Long. = Longitudinal
Trans. = Transverse
* Completely opaque

What is claimed is:
1. A shrinkable polyester film having improved heat-sealing and shrinking properties for packaging, which comprises:
(a) 40-90 parts by weight of a crystalline polyester (A), in which 70-100 mol% of the dicarboxylic acid constitutional unit is terephthalic acid and 50-100 mol% of the glycol constitutional unit is 1,4-cyclohexane dimethanol, having a heat of crystalline melting of not less than 3 cal/g and a melting point in the range of 200°-310° C., and 10-60 parts by weight of a polyester (B) comprising terephthalic acid or 2,6-naphthalene dicarboxylic acid or a mixture thereof as the dicarboxylic acid constitutional unit and ethylene glycol or 1,4-butylene glycol or a mixture thereof as the glycol constitutional unit, said shrinkable polyester film having a ratio of shrinkage in the range of 40-90% in either

(iii) monoaxially stretching the unstretched film by 1.6 to 6.0 times at a temperature in the range of 60°-150° C., either longitudinally or transversely, simultaneously or sequentially stretching the film at a temperature in the range of 60°-150° C., either transversely or longitudinally by 1.6 to 6.0 times, and at a temperature in the range of 60°-150° C., in the other direction to 1.01 to 2.0 times, wherein said stretching is stronger in one direction than the other; or simultaneously or sequentially biaxially stretching the film at a temperature in the range of 60°-150° C. by 1.01 to 6.0 times, and subsequently restretching the film transversely or longitudinally at a temperature in the range of 60°-150° C. by 1.01 to 3.0 times.

2. A method for the production of a shinkable polyester film for packaging having a ratio of shrinkage in the range of 40–90% in either the longitudinal or transverse direction after a 5-minute heat treatment at 100° C., the ratio of shrinkage or expansion being not more than 15% in the other direction after said 5-minute heat treatment at 100° C., and having a haze of not more than 10% at a thickness of 35 μm, which method comprises:
  (a) mixing 40–90 parts by weight of a crystalline polyester (A), in which 70–100 mol% of the dicarboxylic acid constitutional unit is terephthalic acid and 50–100 mol% or the glycol constitutional unit is 1,4-cyclohexane dimethanol, having a heat of crystalline melting of not less than 3 cal/g and a melting point in the range of 200° C.–310° C., with 10–60 parts by weight of a polyester (B) comprising terephthalic acid or 2,6-naphthalene dicarboxylic acid or a mixture thereof as the dicarboxylic acid constitutional unit and ethylene glycol or 1,4-butylene glycol or a mixture thereof as the glycol constitutional unit;
  (b) drying the resultant mixture at a temperature in the range of 100°–250° C. for 1 to 20 hours, and extruding the dried mixture at a temperature in the range of 200°–350° C., thereby obtaining an unstretched film; and
  (c) monoaxially stretching the unstretched film by 1.6 to 6.0 times at a temperature in the range of 60°–150° C. either longitudinally or transversely, simultaneously or sequentially stretching the film at a temperature in the range of 60°–150° C., either transversely or longitudinally by 1.6 to 6.0 times, and at a temperature in the range of 60°–150° C., in the other direction to 1.01 to 2.0 times, wherein the stretching is stronger in one direction than the other, or simultaneously or sequentially biaxially stretching the film at a temperature in the range of 60°–150° C. by 1.01 to 6.0 times, and subsequently restretching the film transversely or longitudinally at a temperature in the range of 60°–150° C. by 1.01 to 3.0 times.

3. The shrinkable polyester film according to claim 1, wherein said polyester (A) comprises terephthalic acid and isophthalic acid as said dicarboxylic acid constitutional unit and 1,4-cyclohexane dimethanol and ethylene glycol as said glycol constitutional unit.

4. The shrinkable polyester film according to claim 1, wherein said polyester (B) comprises polyethylene terephthalate or polybutylene terephthalate or a mixture thereof.

5. The shrinkable polyester film according to claim 1, wherein fine particles having an average diameter in the range of 0.01 to 3.5 μm are contained therein in a ratio in the range of 0.005 to 0.9% by weight.

6. The method according to claim 2, wherein said polyester (A) comprises terephthalic acid and isophthalic acid as said dicarboxylic acid constitutional unit and 1,4-cyclohexane dimethanol and ethylene glycol as said glycol constitutional unit thereof.

7. The method according to claim 2, wherein said polyester (B) comprises polyethylene terephthalate or polybutylene terephthalate or a mixture thereof.

8. The shrinkable polyester film according to claim 1, wherein said crystalline polyester (A) has a heat of crystalline melting of about 3–11 cal/g, and a melting point in the range of 220°–290° C.

9. The shrinkable polyester film according to claim 1, wherein said film has a ratio of shrinkage of 50–90% in either of the longitudinal or transverse directions after the 5-minute heat treatment.

10. The shrinkable polyester film according to claim 1, wherein said film has a haze in the range of 0.1–10% at a thickness of 35 μm.

11. The shrinkable polyester film according to claim 5, wherein said fine particles are selected from the group consisting of kaolin, clay, calcium carbonate, silicon oxide, calcium terephthalate, aluminum oxide, titanium dioxide, calcium phosphate and lithium fluoride.

12. The method according to claim 2, wherein said crystalline polyester (A) has a heat of crystalline melting of about 3–11 cal/g, and a melting point in the range of 220°–290° C.

13. The method according to claim 2, wherein said film has a ratio of shrinkage of 50–90% in either of the longitudinal or transverse directions after the 5-minute heat treatment.

14. The method according to claim 2, wherein said film has a haze in the range of 0.1–10% at a thickness of 35 μm.

15. The method according to claim 2, wherein said fine particles are selected from the group consisting of kaolin, clay, calcium carbonate, silicon oxide, calcium terephthalate, aluminum oxide, titanium dioxide, calcium phosphate and lithium fluoride.

* * * * *